(12) United States Patent
Arora et al.

(10) Patent No.: US 10,567,279 B2
(45) Date of Patent: *Feb. 18, 2020

(54) EGRESS NODE PROTECTION FOR BROADCAST, UNKNOWN UNICAST, OR MULTICAST TRAFFIC IN EVPN TOPOLOGIES

(71) Applicant: Juniper Networks, Inc., Sunnyvale, CA (US)

(72) Inventors: Kapil Arora, Bangalore (IN); Nitin Singh, Fremont, CA (US); Sunil Kumar Malali, Bangalore (IN); Vikram Nagarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,565

(22) Filed: Aug. 10, 2018

(65) Prior Publication Data

US 2019/0007309 A1 Jan. 3, 2019

Related U.S. Application Data

(63) Continuation of application No. 15/157,058, filed on May 17, 2016, now Pat. No. 10,050,873.

(51) Int. Cl.
*H04L 12/723* (2013.01)
*H04L 12/24* (2006.01)
(Continued)

(52) U.S. Cl.
CPC ............. *H04L 45/50* (2013.01); *H04L 12/18* (2013.01); *H04L 12/4641* (2013.01);
(Continued)

(58) Field of Classification Search
CPC . H04L 63/1425; H04L 63/1416; H04L 45/32; H04L 45/50; H04L 45/28
See application file for complete search history.

(56) References Cited

U.S. PATENT DOCUMENTS

| 8,208,371 B2 * | 6/2012 | Li ........................... H04L 41/06 370/217 |
| 9,019,814 B1 | 4/2015 | Mohanty et al. |

(Continued)

FOREIGN PATENT DOCUMENTS

CN 105553848 A 5/2016

OTHER PUBLICATIONS

Juniper Networks, "Juniper Networks EVPN Implementation for Next-Generation Data Center Architectures," https://www.juniper.net/assets/us/en/local/pdf/whitepapers/2000606-en.pdf, Jul. 2015, 62 pages.

(Continued)

*Primary Examiner* — Jamal Javaid
(74) *Attorney, Agent, or Firm* — Harrity & Harrity, LLP

(57) ABSTRACT

A first device may receive network traffic including a first label. The first label may be an inclusive multicast label associated with a second device. The second device may be a designated forwarder for an Ethernet segment. The first device may determine a second label based on receiving the network traffic including the first label. The second label may be used to route the network traffic to a customer edge device, via a third device, rather than the second device. The third device may be a non-designated forwarder for the Ethernet segment. The first device may provide the network traffic, including the second label, to the third device to permit the third device to provide, via the Ethernet segment, the network traffic to the customer edge device based on the second label when a failure occurs in association with the second device.

20 Claims, 7 Drawing Sheets

(51) Int. Cl.
| | |
|---|---|
| *H04L 12/18* | (2006.01) |
| *H04L 12/46* | (2006.01) |
| *H04L 12/751* | (2013.01) |
| *H04L 12/761* | (2013.01) |
| *H04L 12/707* | (2013.01) |
| *H04L 12/703* | (2013.01) |
| *H04L 12/721* | (2013.01) |

(52) U.S. Cl.
CPC .......... *H04L 41/0654* (2013.01); *H04L 45/02* (2013.01); *H04L 45/16* (2013.01); *H04L 45/22* (2013.01); *H04L 45/28* (2013.01); *H04L 45/66* (2013.01); *H04L 12/1886* (2013.01)

(56) References Cited

U.S. PATENT DOCUMENTS

| | | | |
|---|---|---|---|
| 10,050,873 B2* | 8/2018 | Arora | H04L 12/4641 |
| 2010/0238795 A1* | 9/2010 | Boutros | H04L 45/00 370/219 |
| 2012/0300620 A1 | 11/2012 | Kothari et al. | |
| 2016/0378606 A1* | 12/2016 | Sajassi | G06F 11/1423 714/4.2 |

OTHER PUBLICATIONS

Wikipedia, "Multiprotocol Label Switching," https://en.wikipedia.org/wiki/Multiprotocol_Label_Switching, Apr. 13, 2016, 9 pages.

Cisco, "Ethernet VPN (EVPN) and Provider Backbone Bridging-EVPN: Next Generation Solutions for MPLS-based Ethernet Services," http://www.cisco.com/c/en/us/products/collateral/routers/asr-9000-series-aggregation-services-routers/whitepaper_c11-731864.html, May 2014, 10 pages.

Sajassi et al., "BGP MPLS Based Ethernet VPN," https://datatracker.ietf.org/doc/draft-ietf-l2vpn-evpn/03/, Feb. 25, 2013, 47 pages.

Kompella et al., "Multi-homing in BGP-based Virtual Private LAN Service," https://www.ietf.org/archive/id/draft-kompella-l2vpn-vpls-multihoming-02.txt, Nov. 3, 2008, 27 pages.

Li et al., "Use Cases of MPLS Global Label," https://www.ietf.org/archive/id/draft-li-mpls-global-label-usecases-02.txt, Jul. 3, 2014, 9 pages.

Extended European Search report corresponding to EP 16 18 1083.3, dated Mar. 29, 2017, 12 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |  Sub-type=0x0 | Flags(1 octet)|  Reserved=0   |
+-+-+-+-+-+-+-+-+-+-+-+-+-+-+-+-+-+-+-+-+-+-+-+-+-+-+-+-+-+-+-+-+
|  Reserved=0   |         BUM Node Protection Label             |
+-+-+-+-+-+-+-+-+-+-+-+-+-+-+-+-+-+-+-+-+-+-+-+-+-+-+-+-+-+-+-+-+
```

EGRESS NODE PROTECTION FOR BROADCAST, UNKNOWN UNICAST, OR MULTICAST TRAFFIC IN EVPN TOPOLOGIES

RELATED APPLICATION

This application is a continuation of U.S. patent application Ser. No. 15/157,058, filed May 17, 2016 (now U.S. Pat. No. 10,050,873), which is incorporated herein by reference.

BACKGROUND

An Ethernet virtual private network (EVPN) may allow a group of dispersed client sites (e.g., included in a virtual local area network (VLAN)) to be connected using a data link layer (e.g., layer 2) virtual bridge. An EVPN may include one or more customer edge devices (e.g., routers, switches, etc.) connected to one or more provider edge devices (e.g., routers, switches, etc.).

SUMMARY

According to some possible implementations, a first device may include one or more processors to determine a failure associated with a second device. The second device may be a designated forwarder for an Ethernet segment associated with an Ethernet virtual private network instance. The one or more processors may receive network traffic including a first label. The first label may be an inclusive multicast label associated with the second device. The network traffic may be broadcast, unknown unicast, or multicast traffic associated with the Ethernet virtual private network instance. The one or more processors may determine a second label based on the first label and based on determining the failure associated with the second device. The second label may be used to route the network traffic to a customer edge device, via a third device rather than the second device, in an event of the failure associated with the second device. The one or more processors may provide the network traffic, including the second label, to the third device to permit the third device to provide, via the Ethernet segment, the network traffic to the customer edge device based on the second label.

According to some possible implementations, a non-transitory computer-readable medium may store one or more instructions that, when executed by one or more processors of a first device, cause the one or more processors to receive network traffic including a first label. The first label may be an inclusive multicast label associated with a second device. The second device may be a designated forwarder for an Ethernet segment. The one or more instructions may cause the one or more processors to determine a second label based on receiving the network traffic including the first label. The second label may be used to route the network traffic to a customer edge device, via a third device, rather than the second device. The third device may be a non-designated forwarder for the Ethernet segment. The one or more instructions may cause the one or more processors to provide the network traffic, including the second label, to the third device to permit the third device to provide, via the Ethernet segment, the network traffic to the customer edge device based on the second label when a failure occurs in association with the second device.

According to some possible implementations, a method may include determining, by a first device, a failure associated with a second device. The second device may be a designated forwarder for an Ethernet segment associated with an Ethernet virtual private network instance. The method may include receiving, by the first device, network traffic including a first label. The first label may be an inclusive multicast label associated with the second device. The method may include determining, by the first device, a second label based on receiving the network traffic including the first label and based on determining the failure associated with the second device. The method may include providing, by the first device, to a third device, and without providing to the second device, the network traffic including the second label to permit the third device to provide, via the Ethernet segment, the network traffic to a customer edge device based on the second label. The customer edge device may be associated with the Ethernet virtual private network instance.

BRIEF DESCRIPTION OF THE DRAWINGS

FIG. 5 is a diagram of an example message structure associated with a route message.

DETAILED DESCRIPTION

Figure 1A:
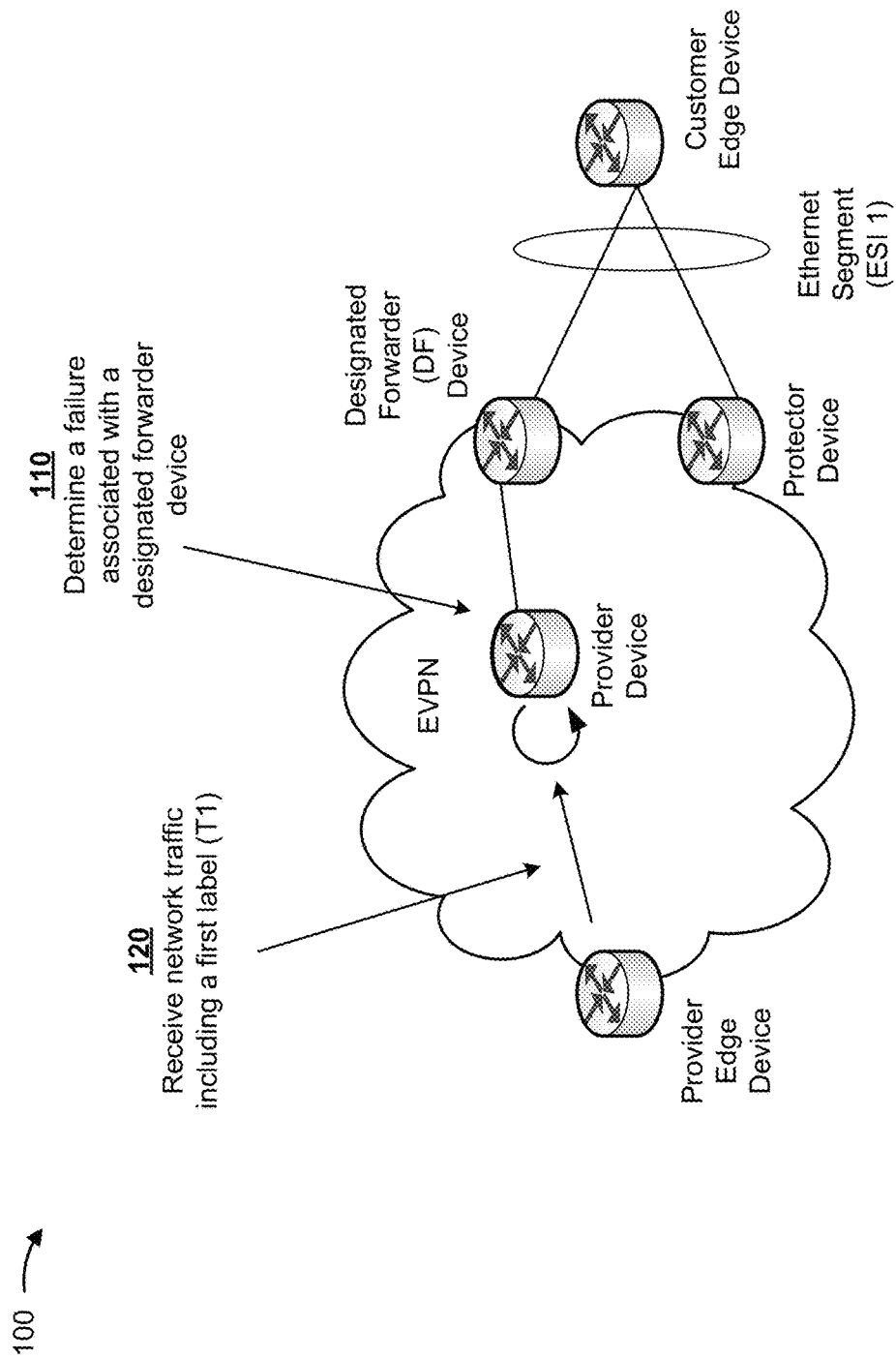
FIGS. 1A-1C are diagrams of an overview of an example implementation described herein.

The following detailed description of example implementations refers to the accompanying drawings. The same reference numbers in different drawings may identify the same or similar elements.

A customer edge device may be multi-homed to two or more provider edge devices via a set of links in order to send and/or receive network traffic associated with a routing and forwarding instance of an EVPN (referred to as an EVI). The set of links (referred to as an Ethernet segment) connecting the customer edge device to the two or more provider edge devices may be identified by an Ethernet segment identifier (ESI). In some cases, a particular provider edge device (e.g., a designated forwarder (DF)) may be responsible for particular actions associated with the EVI, such as sending broadcast, unknown unicast, or multicast (BUM) traffic, associated with the EVI, to the customer edge device via the Ethernet segment. Additionally, in some cases, non-DF provider edge devices associated with the Ethernet segment may receive BUM traffic (e.g., from another provider edge device) and may drop the BUM traffic (e.g., may not provide the BUM traffic to the customer edge device).

If a provider edge device, that is the DF for an Ethernet segment (e.g., identified by a particular ESI), is associated with a failure, then other provider edge devices associated with the Ethernet segment may perform a DF election process in order to elect a different provider edge device to perform the DF role (e.g., forward BUM traffic to the customer edge device). However, this process may be associated with a particular amount of time. For example, one or more of the other provider edge devices may be required to detect the failure associated with the DF device (e.g., based on border gateway protocol (BGP) peering sessions), and may be required to exchange information identifying that each provider edge device is associated with the Ethernet segment. Additionally, the one or more other provider edge devices may be required to wait until a threshold amount of time is satisfied to allow other provider edge devices to exchange information, and may be required to elect another DF device (e.g., using a DF election algorithm). Thus, the time required for electing another DF device may result in black holing associated with BUM traffic for the EVI (e.g., BUM traffic, associated with the EVI, may be dropped by non-DF devices without informing a source that the BUM traffic did not reach the intended destination).

Implementations described herein may enable a provider device (e.g., a router) to determine a failure associated with a DF provider edge device, receive network traffic to provide to the DF provider edge device, and provide the network traffic including a node protection label to another provider edge device. The other provider edge device may identify the node protection label, and may forward the network traffic to the customer edge device associated with the Ethernet segment. In this way, the provider device may reduce a quantity of network traffic that is dropped while the other provider edge devices elect another DF device for the Ethernet segment.

Figure 1B:
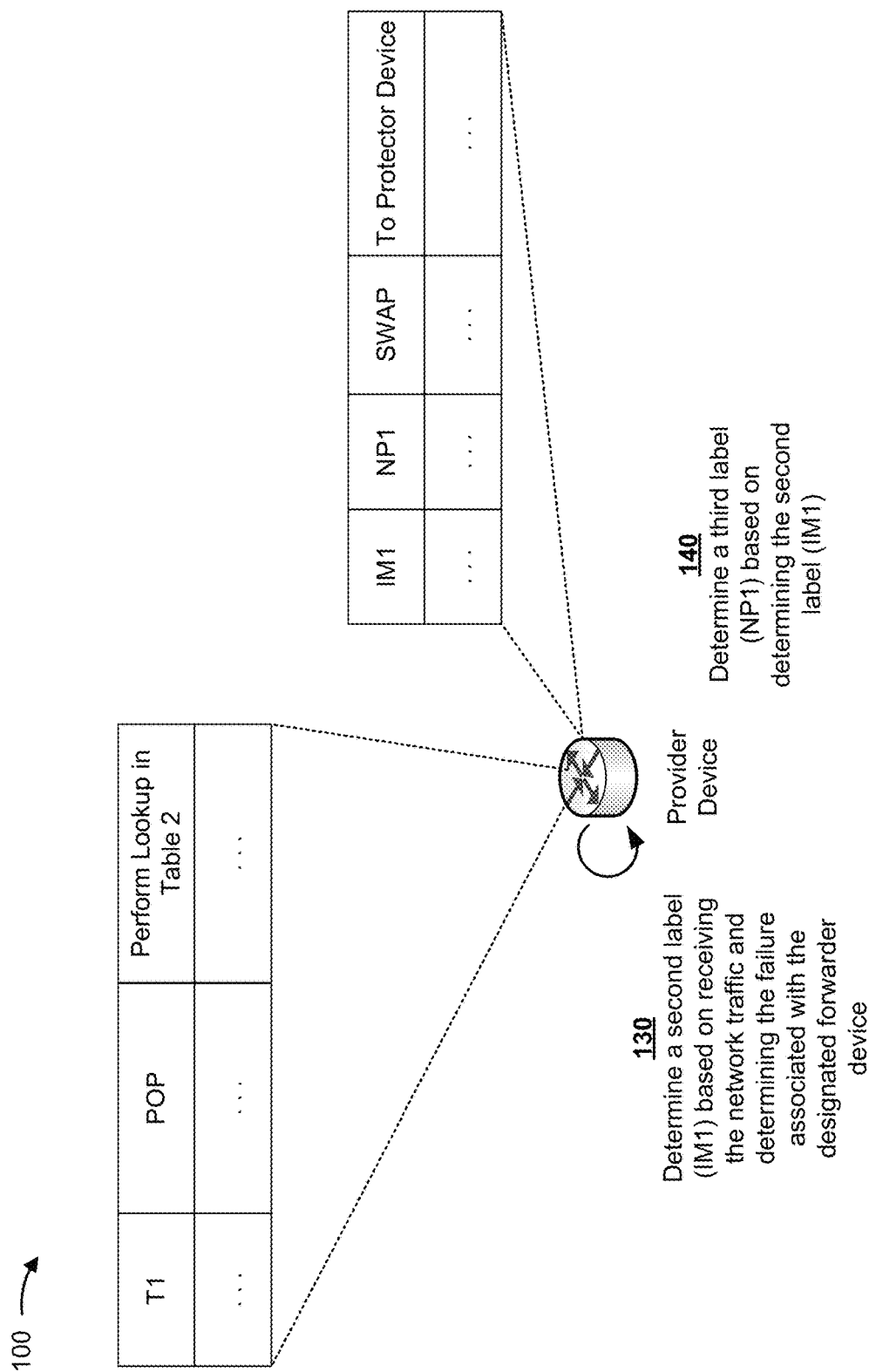
Figure 1C:
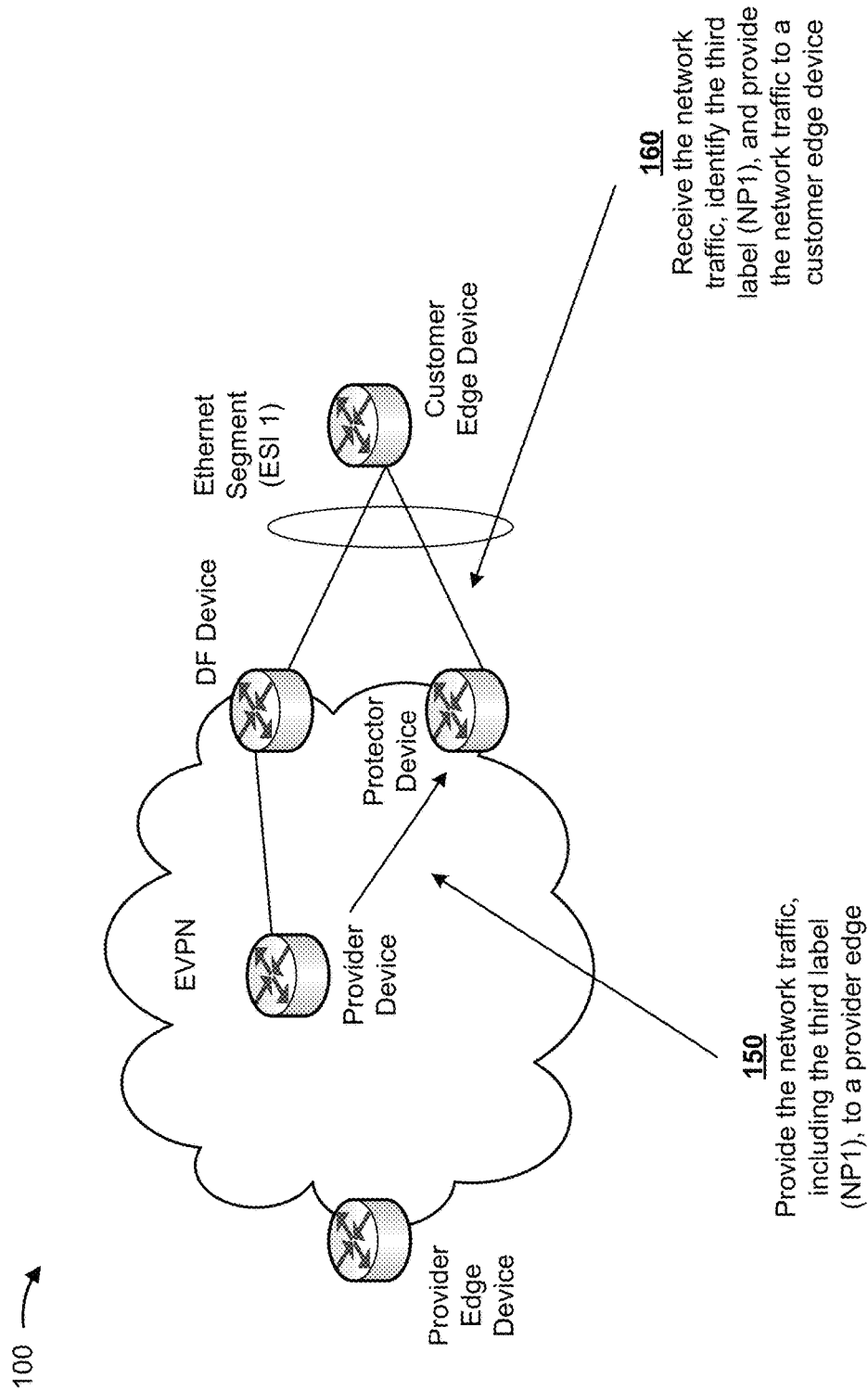

FIGS. 1A-1C are diagrams of an overview of an example implementation 100 described herein. As shown in FIG. 1A, and by reference number 110, a provider device (e.g., a router) may determine a failure associated with a DF device (e.g., a provider edge router). For example, the provider device may determine a failure of a link between the provider device and the DF device, may determine a failure of the DF device (e.g., a crash), or the like. The DF device may be the DF for an Ethernet segment (e.g., identified by ESI 1), and may be responsible for forwarding network traffic (e.g., BUM traffic), associated with an EVI, to the customer edge device. As shown by reference number 120, the provider device may receive network traffic including a first label (T1). The network traffic may include BUM traffic provided by a provider edge device. For example, the provider edge device may receive the network traffic (e.g., from a customer edge device associated with the EVI), may include a multicast label (e.g., an inclusive multicast (IM) label associated with the DF device), may include a transport label (T1), and may provide the network traffic to the provider device.

As shown in FIG. 1B, and by reference number 130, the provider device may determine a second label (IM1) based on receiving the network traffic and determining the failure associated with the DF device. For example, the provider device may determine an IM label (IM1) associated with the network traffic (e.g., an IM label that was advertised by the DF device, and included in the network traffic by the provider edge device). As shown, the provider device may store route information in a first data structure, such as a routing table, that includes a transport label (T1), an operation (e.g., "POP"), and an action (e.g., an action that causes the provider device to perform a lookup in a second data structure). As shown by reference number 140, the provider device may determine a third label (NP1) based on determining the second label (IM1). For example, the provider device may perform a lookup in the second data structure, and may identify a node protection label (NP1) that is mapped to the IM label (IM1). Additionally, the provider device may identify an operation (e.g., "SWAP"), and an action (e.g., forward to protector device), based on information stored in the second data structure.

As shown in FIG. 1C, and by reference number 150, the provider device may provide the network traffic, including the third label (NP1), to a protector device (e.g., a provider edge device). As shown by reference number 160, the protector device may receive the network traffic, may identify the third label (NP1), and may provide the network traffic to a customer edge device. For example, the protector device may identify the third label (NP1), and may identify an Ethernet segment (e.g., ESI 1) and/or an EVI associated with the third label (NP1). In this way, the protector device may forward the network traffic to the customer edge device via the Ethernet segment in the event of a failure associated with the designated forwarder device. Implementations described herein may enable the provider device to forward network traffic to the protector device based on detecting a failure associated with the DF device. In this way, implementations described herein may reduce a quantity of network traffic that is lost based on a failure associated with a DF device, which conserves network traffic by reducing a number of retransmissions of failed network traffic.

As indicated above, FIGS. 1A-1C are provided merely as an example. Other examples are possible and may differ from what was described with regard to FIGS. 1A-1C.

Figure 2:
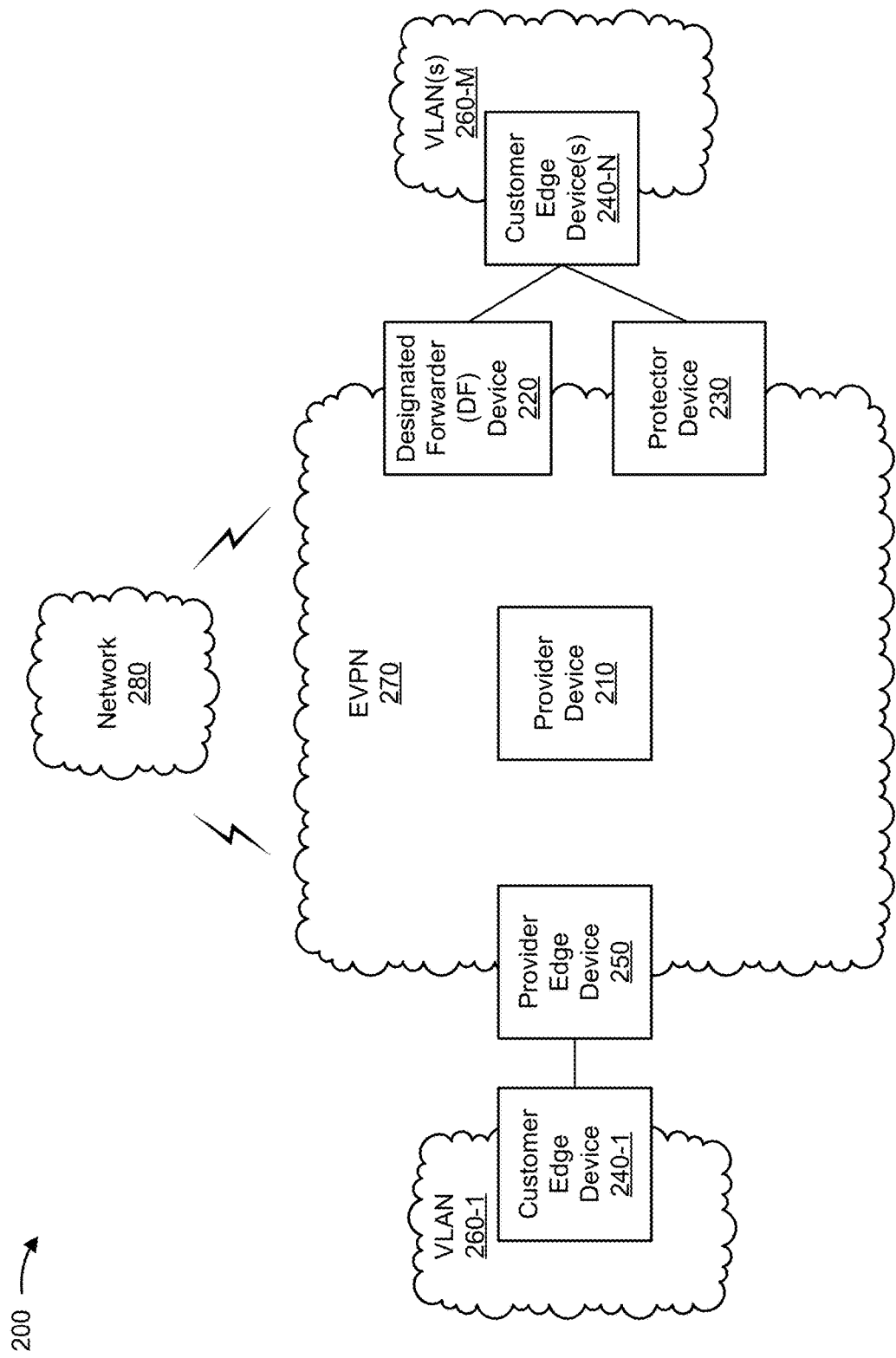
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a provider device 210, a designated forwarder device (DF) device 220, a protector device 230, one or more customer edge devices 240-1 through 240-N(N≥1) (hereinafter referred to collectively as "customer edge devices 240," and individually as "customer edge device 240"), a provider edge device 250, one or more virtual local area networks (VLANs) 260-1 through 260-M (M≥1) (hereinafter referred to collectively as "VLANs 260," and individually as "VLAN 260"), an Ethernet Virtual Private Network (EVPN) 270, and a network 280. Devices of environment 200 may interconnect via wired connections, wireless connections, or a combination of wired and wireless connections.

Provider device 210 includes one or more network devices (e.g., one or more traffic transfer devices) capable of processing and transferring network traffic (e.g., packets). For example, provider device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

DF 220 includes one or more network devices (e.g., one or more traffic transfer devices) capable of processing and transferring network traffic. For example, DF 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, DF 220 is a provider edge device associated with EVPN 270 and assigned a role of a designated forwarder associated with an EVI.

In some implementations, DF 220, protector device 230, and/or provider edge device 250 may be located on an edge of a core network of a service provider (e.g., an Internet service provider), and may provide access to the core network. For example, DF 220, protector device 230, and/or provider edge device 250 may provide access, to the core network, to customer edge device 240 associated with a LAN of a customer (e.g., VLAN 260). Additionally, or alternatively, DF 220, protector device 230, and/or provider edge device 250 may permit communications between different customer edge devices 240 (and/or VLANs 260).

Protector device 230 includes one or more network devices (e.g., one or more traffic transfer devices) capable of processing and transferring network traffic. For example, protector device 230 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, protector device 230 is a provider edge device, associated with EVPN 270, that can assume a role of a designated forwarder associated with an EVI.

Customer edge device 240 includes one or more network devices (e.g., one or more traffic transfer devices) capable of processing and transferring network traffic. For example, customer edge device 240 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, customer edge device 240 may be located on an edge of a customer premises, and may communicate with DF 220, protector device 230, and/or provider edge device 250 to gain access to a service provider's core network. Additionally, or alternatively, customer edge device 240 may communicate with one or more endpoint devices via a LAN (e.g., VLAN 260) to provide the endpoint device(s) with access to the core network via DF 220, protector device 230, and/or provider edge device 250.

Provider edge device 250 includes one or more network devices (e.g., one or more traffic transfer devices) capable of processing and transferring network traffic. For example, provider edge device 250 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, provider edge device 250 is a provider edge device associated with EVPN 270.

VLAN 260 includes one or more wired and/or wireless networks. In some implementations, VLAN 260 may include a virtual local area network. In some implementations, VLAN 260 may include another type of LAN. In some implementations, endpoint devices associated with a customer premises may communicate with one another internally via VLAN 260. Additionally, or alternatively, the endpoint devices may communicate with external devices (e.g., not included in VLAN 260) via customer edge device 240, DF 220, protector device 230, and/or provider edge device 250. While shown as being included in separate VLANs 260, customer edge devices 240 may be included in a single VLAN 260, in some implementations.

EVPN 270 includes a Layer 2 Virtual Private Network (VPN) that allows devices included in VLAN 260 to communicate with other devices included in VLAN 260. In some implementations, EVPN 270 may be provisioned by a service provider to provide point-to-multipoint (e.g., broadcast, unknown unicast, and/or multicast) network traffic between endpoint devices (e.g., via DF 220, protector device 230, provider edge device 250 and/or customer edge devices 240).

Network 280 includes a network associated with routing and/or forwarding traffic provided via EVPN 270. For example, network 280 may a multi-protocol label switching (MPLS) based network, an internet protocol (IP) based network, and/or another type of network through which traffic, associated with VLAN 260 and/or EVPN 270 may travel.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
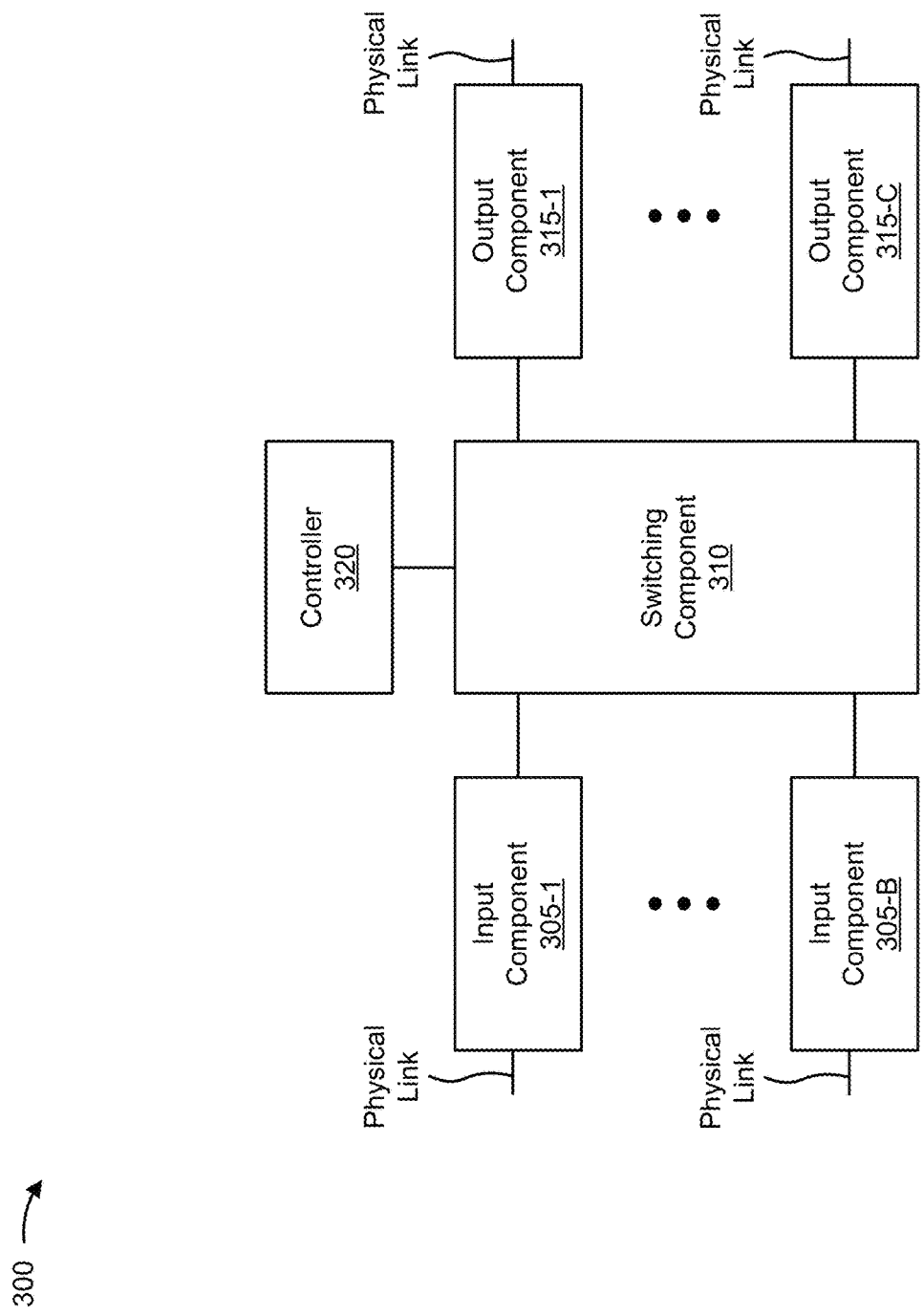
FIG. 3 is a diagram of example components of one or more devices of FIG. 2.

FIG. 3 is a diagram of example components of a device 300. Device 300 may correspond to provider device 210, DF 220, protector device 230, customer edge device 240, and/or provider edge device 250. In some implementations, provider device 210, DF 220, protector device 230, customer edge device 240, and/or provider edge device 250 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
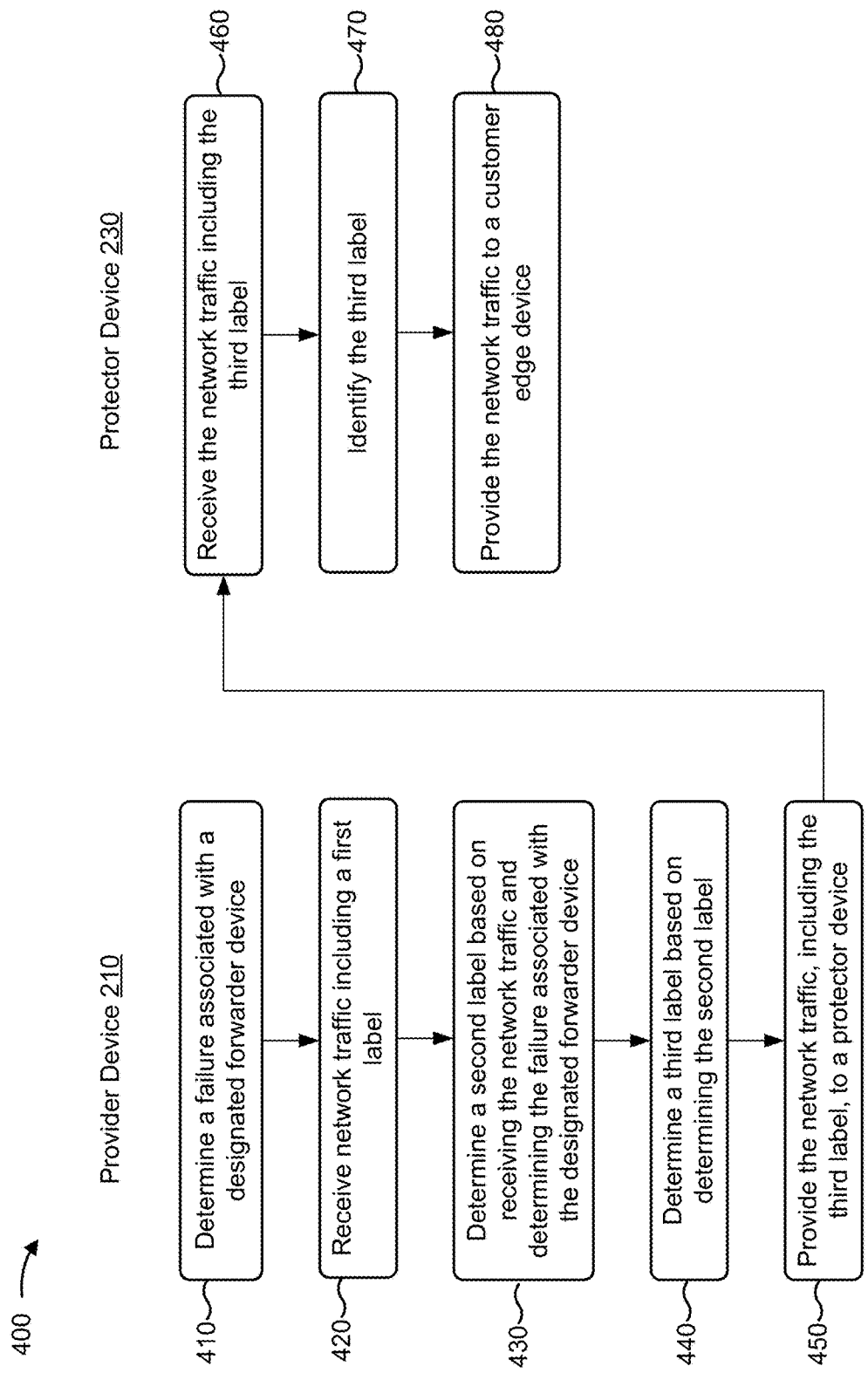
FIG. 4 is a flow chart of an example process for enabling egress node protection for broadcast, unknown unicast, or multicast traffic in EVPN topologies.

FIG. 4 is a flow chart of an example process 400 for enabling egress node protection for broadcast, unknown unicast, or multicast traffic in EVPN topologies. In some implementations, one or more process blocks of FIG. 4 may be performed by provider device 210 and/or protector device 230. In some implementations, one or more process blocks of FIG. 4 may be performed by another device or a group of devices separate from or including provider device 210 and/or protector device 230, such as DF 220, customer edge device 240, and/or provider edge device 250.

As shown in FIG. 4, process 400 may include determining a failure associated with a designated forwarder device (block 410). For example, provider device 210 may determine a failure associated with DF 220. In some implementations, a failure may include a provider device 210 to DF 220 link failure, a DF 220 to customer edge device 240 link failure, a failure of DF 220, MPLS-reachability failure associated with DF 220, or the like. In some implementations, provider device 210 may establish a peering session (e.g., a BGP peering session) with DF 220, and may determine the failure associated with DF 220 based on a state of the peering session (e.g., based on receiving a notification message from DF 220, based on detecting inactivity associated with DF 220, or the like).

In some implementations, provider device 210 may be a penultimate hop in an MPLS network. For example, DF 220 may represent an egress router, and provider device 210 may represent the penultimate hop. In some implementations, provider device 210 may receive network traffic (e.g., from provider edge device 250), and may forward the network traffic to DF 220. Additionally, provider device 210 may receive network traffic including a particular label (e.g., a transport label), and may forward the traffic to DF 220 based on the label, as described elsewhere herein.

In some implementations, customer edge device 240 may be multi-homed to DF 220 and protector device 230 via a set of links (e.g., an Ethernet segment) in order to send and/or receive network traffic associated with a routing and forwarding instance of EVPN 270 (e.g., EVI). The Ethernet segment connecting customer edge device 240 to DF 220 and protector device 230 may be identified by an Ethernet segment identifier (ESI). In some implementations, a VLAN 260 identifier (e.g., an Ethernet tag) may be configured on the Ethernet segment. Additionally, DF 220 may be responsible for particular actions associated with the EVI, such as sending network traffic (e.g., BUM traffic), associated with VLAN 260, to customer edge device 240. For example, assume that DF 220 and protector device 230 are configured (e.g., by an administrator, an operator, or a customer) such that DF 220 is the DF for the Ethernet segment and/or that DF 220 and protector device 230 perform a DF election (e.g., using a DF election algorithm, or the like), and that DF 220 is the designated forwarder for network traffic associated with VLAN 260.

In some implementations, the Ethernet segment may operate in "all-active" redundancy mode. For example, in such cases, DF 220 and protector device 230 may be allowed to forward traffic to and/or from the Ethernet segment. In some cases, protector device 230 may receive network traffic, associated with VLAN 260, from provider edge device 250 and may drop the network traffic (e.g., because protector device 230 is not the DF for the Ethernet segment).

In some implementations, particular devices of EVPN 270 (e.g., provider device 210, DF 220, protector device 230, and/or provider edge device 250) may exchange route information, such as network layer reachability information (NLRI), based on BGP sessions (e.g., via BGP messages).

For example, provider device 210, DF 220, protector device 230, and/or provider edge device 250 may exchange EVPN 270 NLRI, such as Ethernet auto-discovery routes (e.g., route type 1), media access control (MAC)/Internet Protocol (IP) advertisement routes (e.g., route type 2), inclusive multicast Ethernet tag routes (e.g., route type 3), Ethernet segment routes (e.g., route type 4), or the like.

In some implementations, DF 220, protector device 230, and/or provider edge device 250 may advertise one or more labels (e.g., MPLS labels, or the like). For example, DF 220, protector device 230, and/or provider edge device 250 may distribute Inclusive Multicast (IM) labels via inclusive multicast Ethernet tag routes (e.g., route type 3). In this way, provider edge device 250 may receive network traffic (e.g., BUM traffic) via customer edge device 240, and may provide the network traffic to DF 220 and/or protector device 230 including a particular IM label (e.g., corresponding to DF 220 or protector device 230 respectively) and/or another label (e.g., a transport label).

In some implementations, DF 220 and/or protector device 230 may advertise Ethernet segment routes (e.g., route type 4), and may discover that DF 220 and protector device 230 are both connected to the Ethernet segment associated with customer edge device 240. Additionally, protector device 230 may determine that DF 220 is associated with a failure (e.g., based on receiving information identifying the failure, based on failing to receive information from DF 220, or the like). In some implementations, protector device 230 may perform a DF election process associated with the Ethernet segment based on determining that DF 220 is associated with a failure. For example, assume that other provider edge devices 250 are associated with the Ethernet segment. In such cases, protector device 230 and/or other provider edge devices 250 associated with the Ethernet segment may perform a DF election process to elect a DF associated with the Ethernet segment (e.g., based on a DF election algorithm, or the like).

However, a particular amount of time may be associated with discovering that DF 220 is associated with a failure and/or performing the election process. For example, protector device 230 and other provider edge devices 250 may be required to wait a threshold amount of time, exchange device information (e.g., IP addresses), perform the DF election process, or the like. In such cases, the particular amount of time may result in black holing associated with network traffic for the EVI. During this particular amount of time, protector device 230 may assume the role of a designated forwarder, as described below.

As further shown in FIG. 4, process 400 may include receiving network traffic including a first label (block 420). For example, provider device 210 may receive network traffic, associated with VLAN 260, including a transport label associated with DF 220. In some implementations, provider device 210 may store route information in a data structure, such as a routing table, a forwarding table, a flow table, or a virtual routing and forwarding (VRF) table. For example, provider device 210 may store route information such as a next hop indicator that indicates an address (e.g., an IP address, MAC address, or the like) of DF 220, an interface identifier that identifies an interface via which network traffic is to be sent to reach DF 220, a metric associated with routing the network traffic, a label associated with the network traffic, an operation associated with the network traffic (e.g., a "POP" operation), or the like.

In some implementations, the first label may include a transport label. Additionally, provider device 210 may identify the first label, and may determine that the network traffic is to be sent to DF 220 (e.g., based on performing a lookup). In some implementations, provider device 210 may perform an operation associated with the network traffic (e.g., may perform a "POP" operation and remove the first label), and may perform another lookup in another data structure based on identifying the first label (e.g., because DF 220 is associated with the failure), as described below.

As further shown in FIG. 4, process 400 may include determining a second label based on receiving the network traffic and determining the failure associated with the designated forwarder device (block 430). For example, provider device 210 may determine an IM label based on receiving the network traffic and determining that DF 220 is associated with a failure. In some implementations, provider device 210 may store, in a data structure, route information (e.g., a next hop) associated with the transport label that may cause provider device 210 to perform a lookup in another data structure (e.g., a data structure that stores IM labels) in the event of a failure associated with DF 220.

In some implementations, provider device 210 may receive route information (e.g., advertised route types 1, 2, 3, and/or 4), and may store particular route information (e.g., route type 3 information, such as IM labels) in a data structure. For example, provider device 210 may operate in a passive mode, and may store route information associated with network traffic (e.g., may store IM labels advertised by DF 220, protector device 230 and/or provider edge device 250). In this way, provider device 210 may conserve processor and/or memory resources based on storing a subset of advertised route information associated with EVPN 270. In some implementations, provider device 210 may identify the IM label included in the network traffic (e.g., included in a packet), and may forward the network traffic to protector device 230, as described elsewhere herein.

As further shown in FIG. 4, process 400 may include determining a third label based on determining the second label (block 440). For example, provider device 210 may determine a node protection label based on determining the IM label. In some implementations, a node protection label includes a label that enables protector device 230 to identify that network traffic, including the node protection label, is associated with an Ethernet segment for which DF 220 is the DF, as described elsewhere herein.

In some implementations, DF 220, protector device 230, and/or provider edge device 250 may advertise route information including node protection labels (e.g., as an extended community attribute). Additionally, provider device 210 may store the node protection labels in a data structure. In some implementations, provider device 210 may determine (e.g., based on configuration information, received information, or the like) that protector device 230 is to provide network traffic to one or more Ethernet segments, for which DF 220 is the DF, in the event of a failure associated with DF 220. Additionally, provider device 210 may store, in a data structure, a node protection label, associated with protector device 230, and may map the node protection label to an IM label associated with DF 220.

In some implementations, provider device 210 may perform a lookup based on receiving network traffic, including the transport label, in the event of a failure associated with DF 220. For example, provider device 210 may determine an IM label associated with the network traffic, and may determine a node protection label associated with the IM label. In this way, provider device 210 may provide the network traffic, including the node protection label, to protector device 230, as described below.

As further shown in FIG. 4, process 400 may include providing the network traffic, including the third label, to a protector device (block 450). For example, provider device 210 may provide the network traffic, including the node protection label, to protector device 230. In some implementations, provider device 210 may store information that identifies an operation associated with the IM label (e.g., a swap operation), a next hop indicator that indicates an address of protector device 230, an interface identifier that identifies an interface via which network traffic is to be sent to reach protector device 230, a path via which network traffic is to be sent to reach protector device 230 (e.g., that identifies an MPLS tunnel), or the like. In some implementations, provider device 210 may perform an operation (e.g., a "swap" operation) associated with the network traffic, remove the IM label, and push the node protection label onto a packet. In this way, protector device 230 may receive the network traffic, including the node protection label, and may forward the network traffic to customer edge device 240, as described elsewhere herein.

As further shown in FIG. 4, process 400 may include receiving the network traffic including the third label (block 460), identifying the third label (block 470), and providing the network traffic to a customer edge device (block 480). For example, protector device 230 may receive, from provider device 210, the network traffic including the node protection label, may identify the node protection label, and may provide the network traffic to customer edge device 240.

In some implementations, protector device 230 may receive information that identifies an Ethernet segment, associated with VLAN 260, for which DF 220 is a designated forwarder. For example, protector device 230 may be configured with (e.g., by an operator, or the like) and/or receive (e.g., from DF 220) route information that identifies an ESI, an EVI, and/or a VLAN 260 (e.g., based on an Ethernet Tag), for which DF 220 is a designated forwarder. Additionally, protector device 230 may store the route information in a data structure, and may map the route information to a node protection label. In this way, protector device 230 may receive network traffic, that includes the node protection label, may remove the node protection label, and may forward the network traffic to customer edge device 240 (e.g., associated with the Ethernet segment for which DF 220 is the designated forwarder). In this way, protector device 230 may forward network traffic to customer edge device 240 while protector device 230 and/or other provider edge devices 250 perform a designated forwarder election process associated with the Ethernet segment for which DF 220 is the designated forwarder, thereby reducing a quantity of lost network traffic.

Implementations described herein may reduce a quantity of network traffic that is dropped based on a failure associated with DF 220. For example, implementations described herein enable provider device 210 to determine a failure associated with DF 220, and provide network traffic to another provider edge device (e.g., protector device 230) such that protector device 230 may provide the network traffic to customer edge device 240 (e.g., despite not being the designated forwarder for a particular Ethernet segment and/or EVI).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is an example of a format 500 for a route message. For example, the route message shown in FIG. 5 may represent an inclusive multicast Ethernet tag route (e.g., route type 3). As shown in FIG. 5, the route message may include a field associated with a BUM node protection label. For example, the field associated with the BUM node protection label may be used to advertise a node protection label.

Although FIG. 5 shows an example of a format for a route message, in some implementations, a route message may include additional fields, fewer fields, different fields, or differently arranged fields than those depicted in FIG. 5.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memories; and
one or more processors to:
    establish a peering session with a second device;
    determine a failure associated with the second device,
        the second device being a designated forwarder for an Ethernet segment associated with an Ethernet virtual private network instance;
    receive network traffic including a first label,
        the first label being a multicast label associated with the second device,
        the network traffic being broadcast, unknown unicast, or multicast traffic associated with the Ethernet virtual private network instance;
    receive information, from the second device, that identifies a second label,
        the second label being used to route the network traffic to a customer edge device, via a third device rather than the second device, in an event of the failure associated with the second device;
    store the information that identifies the second label based on receiving the information that identifies the second label;
    determine the second label based on receiving the information that identifies the second label; and
    provide the network traffic, including the second label, to the third device to permit the third device to provide, via the Ethernet segment, the network traffic to the customer edge device based on the information that identifies the second label.

2. The first device of claim 1, where the one or more processors, when determining the failure associated with the second device, are to:
    determine the failure after establishing the peering session with the second device.

3. The first device of claim 1, where the one or more processors are further to:
    determine a third label associated with the network traffic,
        the third label being a transport label associated with the second device; and
    where the one or more processors, when determining the second label, are to:
        determine the second label based on the third label associated with the network traffic.

4. The first device of claim 1, where the one or more processors are further to:
    store information that identifies the first label and an operation associated with the first label,
        the operation being associated with removing the first label from the network traffic and including the second label with the network traffic; and
    where the one or more processors, when providing the network traffic to the third device, are to:
        provide the network traffic to the third device based on the information that identifies the first label and the operation associated with the first label.

5. The first device of claim 1, where the one or more processors are further to:
    determine a third label associated with the network traffic,
        the third label being a transport label that identifies the second device; and
    perform a lookup using a data structure based on the third label; and
    where the one or more processors, when determining the second label, are to:
        determine the second label based on performing the lookup using the data structure.

6. The first device of claim 1, where the failure associated with the second device is at least one of:
    a failure of a first link between the first device and the second device;
    a failure of the second device; or
    a failure of a second link between the second device and the customer edge device.

7. A non-transitory computer-readable medium storing instructions, the instructions comprising:
one or more instructions that, when executed by one or more processors of a first device, cause the one or more processors to:
    establish a peering session with a second device;
    receive network traffic including a first label,
        the first label being a multicast label associated with the second device,
        the second device being a designated forwarder for an Ethernet segment;
    determine a second label based on receiving the network traffic including the first label,
        the second label being used to route the network traffic to a customer edge device, via a third device, rather than the second device,
        the third device being a non-designated forwarder for the Ethernet segment;
    store information that identifies the first label and an operation associated with the first label,
        the operation being associated with removing the first label from the network traffic and including the second label with the network traffic; and
    provide the network traffic, including the second label, to the third device to permit the third device to provide, via the Ethernet segment, the network traffic to the customer edge device based on the information that identifies the first label and the operation associated with the first label.

8. The non-transitory computer-readable medium of claim 7, where the one or more instructions, that cause the one or more processors to determine the second label, cause the one or more processors to:
    determine the second label based on the peering session.

9. The non-transitory computer-readable medium of claim 7, where the one or more instructions, when executed by the one or more processors, further cause the one or more processors to:
    determine a third label associated with the network traffic,
        the third label being a transport label that identifies the second device; and
    perform a lookup using a data structure based on the third label; and
    where the one or more instructions, that cause the one or more processors to determine the second label, cause the one or more processors to:
        determine the second label based on performing the lookup using the data structure.

10. The non-transitory computer-readable medium of claim 7, where the one or more instructions, when executed by the one or more processors, further cause the one or more processors to:
    store route information associated the second device; and
    where the one or more instructions, that cause the one or more processors to determine the second label, cause the one or more processors to:
        determine the second label based on the route information.

11. The non-transitory computer-readable medium of claim 7, where the first device is a penultimate hop associated with an Ethernet virtual private network instance.

12. The non-transitory computer-readable medium of claim 7, where a failure associated with the second device is at least one of:
   a failure of a first link between the first device and the second device;
   a failure of the second device; or
   a failure of a second link between the second device and the customer edge device.

13. A method, comprising:
   establishing, between a first device and a second device, a peering session;
   determining, by the first device, a failure associated with the second device,
      the second device being a designated forwarder for an Ethernet segment associated with an Ethernet virtual private network instance;
   receiving, by the first device, network traffic including a first label,
      the first label being a multicast label associated with the second device;
   determining, by the first device, a second label based on receiving the network traffic including the first label and based on determining the failure associated with the second device,
      where determining the second label comprises:
         determining the second label based on a third label associated with the network traffic;
   determining, by the first device, the third label associated with the network traffic,
      the third label indicating that the network traffic is to be forwarded to the second device; and
   providing, by the first device, to a third device, and without providing to the second device, the network traffic including the second label to permit the third device to provide, via the Ethernet segment, the network traffic to a customer edge device based on the second label,
      the customer edge device being associated with the Ethernet virtual private network instance.

14. The method of claim 13, where determining the second label comprises:
   determining the second label based on the peering session.

15. The method of claim 13, where the failure associated with the second device is at least one of:
   a failure of a first link between the first device and the second device;
   a failure of the second device; or
   a failure of a second link between the second device and the customer edge device.

16. The method of claim 13, further comprising:
   storing route information associated the second device; and
   where determining the second label comprises:
      determining the second label based on the route information.

17. The method of claim 13, further comprising:
   storing information that identifies the first label and an operation associated with the first label,
      the operation being associated with removing the first label from the network traffic and including the second label with the network traffic; and
   where providing the network traffic to the third device comprises:
      providing the network traffic to the third device based on the information that identifies the first label and the operation associated with the first label.

18. The first device of claim 1, where the one or more processors are further to:
   determine a third label associated with the network traffic;
   determine a mapping of the second label to the third label; and
   where the one or more processors, when determining the second label, are to:
      determine the second label based on the mapping of the second label to the third label.

19. The first device of claim 1, where the one or more processors are further to:
   store route information associated the second device; and
   where the one or more processors, when determining the second label, are to:
      determine the second label based on the route information.

20. The first device of claim 1, where the first device is a penultimate hop associated with the Ethernet virtual private network instance.

* * * * *